April 25, 1933.  W. J. ANDRES  1,905,328
CONTROLLING MEANS
Filed May 6, 1927
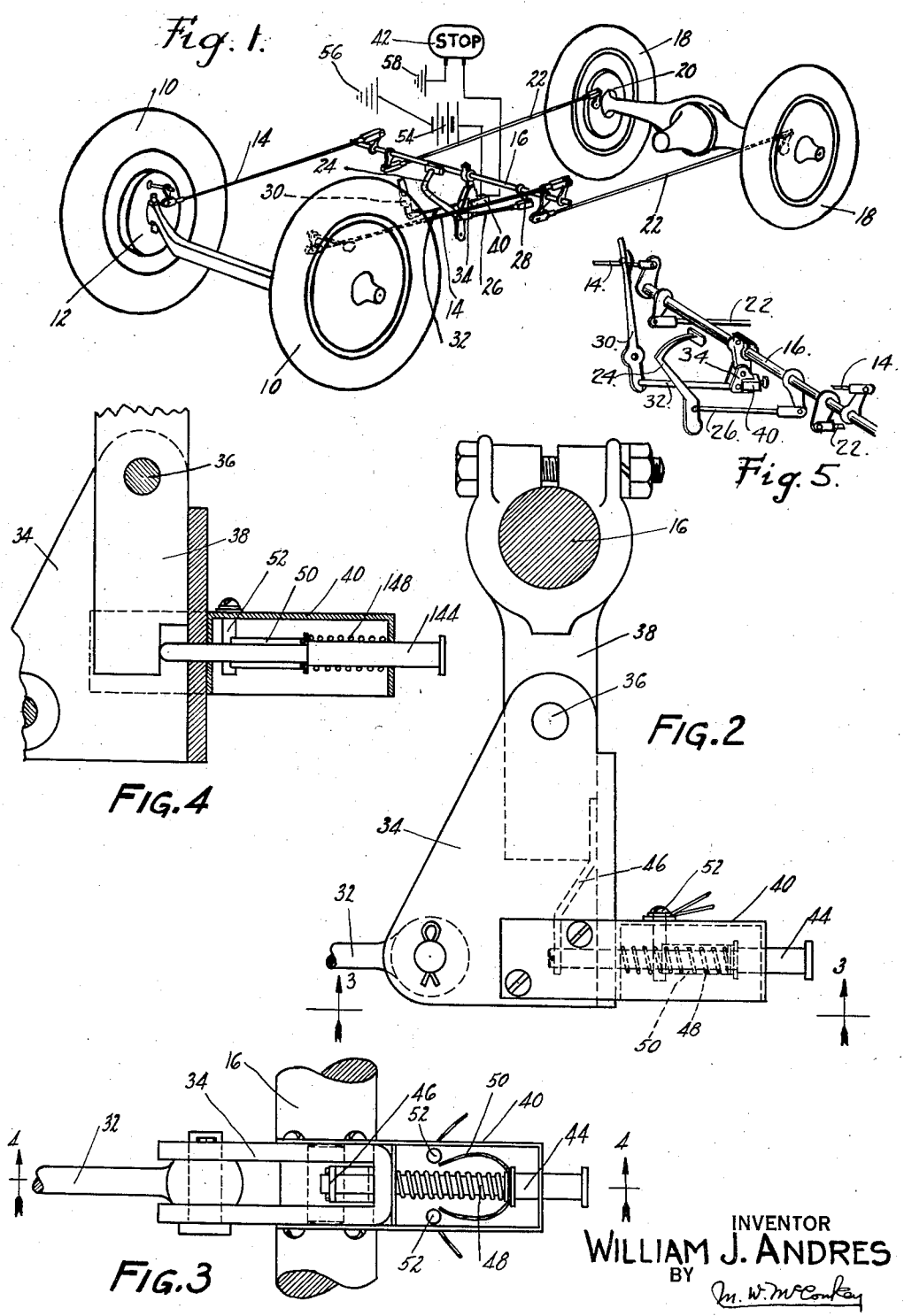
INVENTOR
WILLIAM J. ANDRES
BY
ATTORNEY Patented Apr. 25, 1933

1,905,328

UNITED STATES PATENT OFFICE

WILLIAM J. ANDRES, OF SOUTH BEND, INDIANA, ASSIGNOR TO BENDIX BRAKE COMPANY, OF SOUTH BEND, INDIANA, A CORPORATION OF ILLINOIS

CONTROLLING MEANS

Application filed May 6, 1927. Serial No. 189,280.

This invention relates to brakes and to signals utilized therewith, and is illustrated as embodied in an automobile chassis equipped with four-wheel brakes. In one desirable arrangement of the brake-applying mechanism, the brakes may all be applied either by a foot pedal or by a hand lever which not only applies the brakes but also depresses the foot pedal (or by two equivalent alternatively-operable instrumentalities), preferably operating a single cross-shaft connected to all of the brakes. Heretofore the stop-light, or an equivalent signal, has always been operated when the brakes were applied by a mechanism of this character, and was thus necessarily left on as long as the car remained parked with the emergency brakes applied,—i. e. with the hand lever operated.

An important object of the invention is to arrange the switch or other signal-controlling device, for use with mechanism of this character, but in such a manner as to be operated whenever the brakes are applied in service, and yet to remain inoperative when the car is left parked with the brakes applied by the hand lever.

In one desirable arrangement, the switch is not operated by manipulation of the hand lever in such a manner as to depress the pedal, but is operated whenever the pedal is depressed by the driver's foot independently of the hand lever. Preferably this is accomplished by mounting the switch in a novel manner on an over-running connection from the hand lever or its equivalent.

The above and other objects and features of the invention, including various novel and desirable features of construction, will be apparent from the following description of the illustrative embodiments shown in the accompanying drawing, in which:

Figure 1 is a diagrammatic perspective of an automobile chassis embodying the invention;

Figure 2 is a side elevation of an over-running connection from the hand lever, and of the stop-light switch;

Figure 3 is a bottom plan view of the parts shown in Figure 2;

Figure 4 is a section corresponding to a view on the line 4—4 of Figure 3, but showing a modified switch arrangement; and Figure 5 is a slightly enlarged diagrammatic perspective of a part of the automobile corresponding substantially to Figure 1, but taken from a slightly different angle and showing the left front operating rod broken away.

The chassis shown in Figure 1 includes front wheels 10 having brakes 12 operated by connections 14 from a cross-shaft 16, and rear wheels 18 having brakes 20 operated by connections 22 from the same shaft 16.

Shaft 16 may be operated, to apply all four brakes, by depressing a foot pedal 24, or an equivalent, connected by a link 26 to an arm 28 on the shaft. It may also be operated by a hand lever 30, or an equivalent connected by a link 32 to a channel-section part 34 mounted on a pivot 36 carried by an arm 38 on the shaft 16.

It will be seen that the pivotally-connected parts 38 and 34 constitute an over-running connection between the hand lever 30 and the shaft 16,—i. e. the hand lever can operate the shaft, to hold the brakes applied when the car is left parked, but when the shaft is operated by the pedal the part 34 swings idly on part 38 without affecting lever 30, which remains held stationary in idle position by its ratchet (not shown). On the other hand, operation of the hand lever 30 will not only apply the brakes, but will also depress the foot pedal.

Heretofore it has been considered unavoidable, in a "hook-up" of this character, that the stop-light (or equivalent warning signal) should be actuated by the depression of the pedal when the hand lever is operated, so that the light would have to be left burning when the car was left parked with the brakes applied.

An important feature of the present invention relates to arranging a switch 40 for a stop-light (indicated diagrammatically at 42), or equivalent controlling means for some other type of signal, in such a manner as to be operated by service use of pedal 24, without being operated by idle depression of the pedal when the hand lever 30 is operated to apply the brakes.

In the arrangement of Figures 2 and 3, the switch 40 includes a casing secured to the part 34 of the over-running connection, and within which is a switch member such as a plunger 44 movable lengthwise, and having its left end connected to a leaf spring 46 secured to the end of arm 38. A coil spring 48 urges the plunger to the right. Plunger 44 carries a leaf spring 50, generally C-shaped in plan view, arranged yieldingly to bridge contacts 52 when the plunger 44 is moved to the left. One contact 52 is connected to the battery 54 (Figure 1), which is grounded on the frame at 56. The other contact 52 is connected to the stop-light 42, which in turn is grounded, as indicated at 58 in the diagram.

In this arrangement, when the pedal is depressed by the driver to apply the brakes, the hand lever 30 and part 34 remain in idle position, and arm 38, forming the other part of the over-running connection, swings toward the left, whereupon spring 46 closes the switch by moving plunger 44 to the left, thus closing the stop-light circuit. If, however, the hand lever is operated to apply the brakes, and even though it does at the same time depress the pedal, the switch is not closed, for arm 38 and part 34 move together, spring 46 remains in the relative position of Figure 2, and spring 48 holds the plunger 44 in its idle (right-hand) position.

The arrangement of Figure 4 differs from that described above, in that a spring 148 urges the plunger 144 to the left to cause leaf spring 50 to bridge contacts 52 to close the switch. The plunger is normally held in its idle (right-hand) position by direct engagement of the end of plunger 144 with the lower end of arm 38.

While two illustrative embodiments have been described in detail, it is not my intention to limit the scope of the invention to those particular embodiments, or otherwise than by the terms of the appended claims.

I claim:

1. A vehicle having, in combination, brakes, a pedal, a supplemental brake operating member, means whereby either said pedal or said operating member may apply the brakes, a stop-light, and means whereby said stop-light may be lighted only by actuation of the brakes by said pedal.

2. A vehicle having, in combination, brakes, a pedal, a supplemental brake operating member, means whereby said pedal may apply the brakes, means whereby said operating member may apply the brakes and depress said pedal, a signal, a controlling device for the signal, and means whereby said controlling device is actuated only by the operation of the brakes by the pedal.

3. A vehicle having brakes and, in combination therewith, two brake-applying devices, means whereby one of said devices applies the brakes independently of the other, means whereby the second mentioned device applies the brakes and at the same time operates the first, a stop-light, a switch for lighting the stop-light, and means whereby said switch is closed only by the operation of the brakes by the first device acting independently of the second.

4. A vehicle having brakes and, in combination therewith, two brake-applying devices, means whereby one of said devices applies the brakes independently of the other, means whereby the second mentioned device applies the brakes and at the same time operates the first, a signal, a control for operating the signal, and means whereby said control is actuated only by the application of the brakes by the first device acting independently of the second.

5. In a vehicle having a brake mechanism, two brake operating units for said mechanism, an over-running connection between one of said units and said mechanism, said over-running connection having relatively movable parts, a stop-light, a controlling switch for the stop-light, said switch having relatively movable contacts connected respectively to said relatively movable parts to be actuated thereby.

6. In a vehicle having a brake mechanism, two brakes operating units for said mechanism, an over-running connection between one of said units and said mechanism, said over-running connection having relatively movable parts, a signal, a controlling means for the signal, said controlling means having relatively movable parts connected respectively to the relatively movable parts of said over-running connection for actuation thereby.

7. In a vehicle having a brake mechanism, two brake operating units for said mechanism, an over-running connection between one of said units and said mechanism, said over-running connection having relatively movable parts, a stop-light, a controlling switch for the stop-light, and means whereby said switch will be closed upon relative movement of the parts of the over-running connection.

8. In a vehicle having a brake mechanism, two brake operating units for said mechanism, an over-running connection between one of said units and said mechanism, said over-running connection having relatively movable parts, a signal, a controlling means for the signal, and means whereby said controlling means will be actuated by relative movement of the parts of the over-running connection.

9. Brake controlling mechanism comprising, in combination with a controlled means, two brake operating units, an over-running connection between one of said units and the controlled means, said over-running connection having two relatively movable parts, a switch, a signal connected with said switch, and means whereby said switch will be operated by relative movement of said parts.

10. Brake controlling means comprising, in combination with a controlled means, a brake operating unit, an over-running connection between said unit and said controlled means, said over-running connection having two pivotally-connected parts jointly forming an operating lever, a switch, a signal connected with said switch, and means whereby said switch will be operated by relative movement of said parts.

11. Brake controlling means comprising, in combination with a controlled means, a brake operating device, an over-running connection between said device and said controlled means, said over-running connection having two relatively movable parts, switch contacts mounted on one of said parts, a plunger slidably mounted on said part and connected with the other part for movement thereby, and other switch contacts carried by said plunger and a signal connected in circuit with said switch contacts.

12. Controlling means comprising, in combination, an over-running connection including two relatively movable parts, a switch mounted on one of said parts and having an operating plunger, and a connection between said operating plunger and the other of said parts whereby relative movement of said parts will operate the switch and a signal connected in circuit with said switch.

13. A vehicle having brakes and comprising, in combination therewith, a foot pedal, a hand lever, a connection from the lever to the brakes including a part positively connected for movement with the lever only, a second part positively connected for movement with the brake mechanism both when operated by the lever and when operated by the pedal, a signal, and a signal-controlling device connected to both of said parts to be operated by their relative movement when the brakes are operated by the pedal.

14. A vehicle having brakes and comprising, in combination therewith, two operating members, a connection from the first of said members to the brakes including a part positively connected for movement with said first member only, and another part positively connected for movement by either of said members, a signal, and a signal-controlling device connected to both of said parts to be operated by their relative movement when the brakes are operated with the first member in a stationary position.

15. A vehicle having, in combination, brake mechanism, a pedal, a hand lever, means whereby said pedal may operate said mechanism, means whereby said hand lever may operate said mechanism and depress said pedal, said last mentioned means comprising a lost motion device having a part positively connected for movement with the hand lever and a second part positively connected for movement with the brake mechanism, a brake signal, a switch for operating said signal carried by one of the parts of said lost motion device and connected to the other of said parts, whereby upon relative motion of the parts of the lost motion device the switch will be closed and the brake signal actuated.

In testimony whereof, I have hereunto signed my name.

WILLIAM J. ANDRES.